United States Patent
Kim et al.

(10) Patent No.: US 10,691,909 B2
(45) Date of Patent: Jun. 23, 2020

(54) USER AUTHENTICATION METHOD USING FINGERPRINT IMAGE AND METHOD OF GENERATING CODED MODEL FOR USER AUTHENTICATION

(71) Applicant: SAMSUNG ELECTRONICS CO., LTD., Suwon-si (KR)

(72) Inventors: Namjoon Kim, Anyang-si (KR); Kyuhong Kim, Seoul (KR); Chang Kyu Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/654,023

(22) Filed: Jul. 19, 2017

(65) Prior Publication Data

US 2018/0137329 A1   May 17, 2018

(30) Foreign Application Priority Data

Nov. 11, 2016   (KR) .................. 10-2016-0150024

(51) Int. Cl.
| | |
|---|---|
| *G06K 9/00* | (2006.01) |
| *G06K 9/46* | (2006.01) |
| *G06K 9/62* | (2006.01) |

(52) U.S. Cl.
CPC ......... *G06K 9/00013* (2013.01); *G06K 9/001* (2013.01); *G06K 9/0012* (2013.01); *G06K 9/00067* (2013.01); *G06K 9/00087* (2013.01); *G06K 9/00093* (2013.01); *G06K 9/00114* (2013.01); *G06K 9/4642* (2013.01); *G06K 9/6218* (2013.01)

(58) Field of Classification Search
None
See application file for complete search history.

(56) References Cited

U.S. PATENT DOCUMENTS

| | | | | |
|---|---|---|---|---|
| 5,239,590 | A | * | 8/1993 | Yamamoto ......... G07C 9/00087 340/5.83 |
| 7,616,787 | B2 | | 11/2009 | Boshra |
| 8,692,667 | B2 | | 4/2014 | Richardson et al. |
| 9,036,876 | B2 | | 5/2015 | Rane et al. |
| 9,530,042 | B1 | * | 12/2016 | Saeed .................. G06K 9/0008 |
| 9,690,972 | B1 | * | 6/2017 | Chau .................. G06K 9/00093 |
| 2012/0184219 | A1 | | 7/2012 | Richardson et al. |
| 2015/0036894 | A1 | * | 2/2015 | Matsunami ........ G06K 9/00885 382/115 |

FOREIGN PATENT DOCUMENTS

| | | | |
|---|---|---|---|
| JP | 4405656 | B2 | 1/2010 |
| JP | 4616677 | B2 | 1/2011 |

(Continued)

*Primary Examiner* — Leon Viet Q Nguyen
(74) *Attorney, Agent, or Firm* — NSIP Law

(57) ABSTRACT

A user authentication method using a fingerprint image, the user authentication method includes receiving at least a portion of a fingerprint image of a user; actuating a processor to divide the fingerprint image into a plurality of first sub-blocks; generate a set of input codes by encoding the first sub-blocks based on a coded model; measure a similarity between the set of the input codes and a set of registered codes included in a pre-registered binary codebook; and authenticate the user based on the similarity.

22 Claims, 19 Drawing Sheets

(56) References Cited

FOREIGN PATENT DOCUMENTS

| | | |
|---|---|---|
| JP | 5134655 B2 | 1/2013 |
| KR | 10-0572768 B1 | 4/2006 |
| KR | 10-0622245 B1 | 9/2006 |
| KR | 10-0752640 B1 | 8/2007 |
| KR | 10-1432011 B1 | 8/2014 |
| KR | 10-1515926 B1 | 5/2015 |
| WO | WO 2004/006185 A1 | 1/2004 |
| WO | WO 2009/042392 A3 | 4/2009 |

* cited by examiner

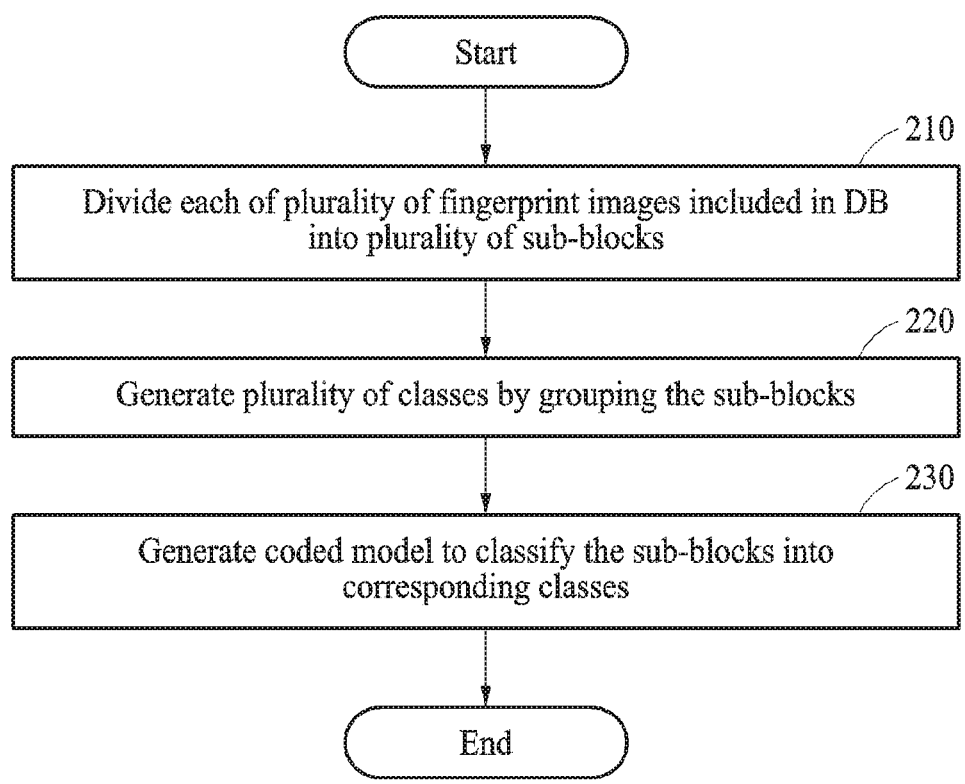

FIG. 6
610
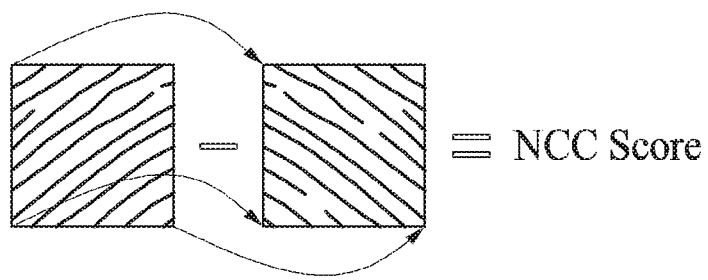
630
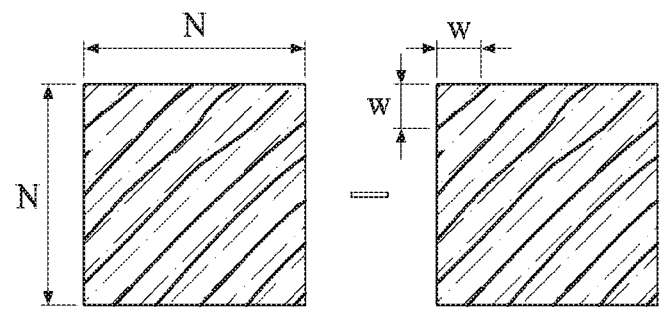

USER AUTHENTICATION METHOD USING FINGERPRINT IMAGE AND METHOD OF GENERATING CODED MODEL FOR USER AUTHENTICATION

CROSS-REFERENCE TO RELATED APPLICATION(S)

This application claims the benefit under 35 USC § 119(a) of Korean Patent Application No. 10-2016-0150024, filed on Nov. 11, 2016, in the Korean Intellectual Property Office, the entire disclosure of which is incorporated herein by reference for all purposes.

BACKGROUND

1. Field

The following description relates to a user authentication method using a fingerprint image and a method of generating a coded model for user authentication.

2. Description of Related Art

In various wearable devices or various mobile devices (for example, smartphones) a variety of bio information of users (for example, information about fingerprints, irises, voice, faces or blood vessels) are used for security and authentication. For example, when a fingerprint is used, user authentication is performed by matching with enrolled fingerprint images based on feature point information (for example, minutiae information) and image information. In this example, it is easy to restore fingerprint information of a user based on feature point information and image information of users registered in mobile devices.

Also, as a number of registered users and a number of registered fingers increase, a memory space for storing enrolled fingerprints greatly increases and a matching time for user authentication also increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a user authentication method using a fingerprint image includes receiving at least a portion of a fingerprint image of a user; actuating a processor to: divide the fingerprint image into a plurality of first sub-blocks; generate a set of input codes by encoding the first sub-blocks based on a coded model; measure a similarity between the set of the input codes and a set of registered codes included in a pre-registered binary codebook; and authenticate the user based on the similarity.

The dividing of the fingerprint image into the first sub-blocks may include one of dividing the fingerprint image into the first sub-blocks so that cropped portions of the fingerprint image overlap; and dividing the fingerprint image into the first sub-blocks so that the cropped portions do not overlap.

The dividing of the fingerprint image into the first sub-blocks may include dividing the fingerprint image into the first sub-blocks by changing a position at which the fingerprint image is to be cropped.

The generating of the set of the input codes may include classifying the first sub-blocks into one of a plurality of classes based on cropped portions of the fingerprint image, the classes being distinguished from each other; and generating the set of the input codes by the first sub-blocks encoded based on the classes.

The coded model may be generated by training a parameter of a deep neural network so that a class to which each of the first sub-blocks belongs is output in response to an input of each of the first sub-blocks.

The fingerprint image may include a substantially full or a partial fingerprint of the user captured by a fingerprint scanner coupled to the processor.

The measuring of the similarity may include measuring the similarity based on whether the set of the input codes matches the set of the registered codes.

The measuring of the similarity may include performing a bitwise AND operation of bits of the pre-registered binary codebook and bits of a binary codebook corresponding to the set of the input codes; adding up results of the bitwise AND operation; comparing a sum obtained by adding up the results to a preset threshold; and measuring the similarity based on a result of the comparing.

The measuring of the similarity may include calculating a similarity score between a fingerprint image encoded based on the coded model and registered codes included in the binary codebook based on a Bayesian probability; and measuring the similarity based on the similarity score.

The user authentication method may further include receiving a plurality of enrolled fingerprint images of the user; and generating the binary codebook based on the coded model and the enrolled fingerprint images.

The generating of the binary codebook may include dividing each of the enrolled fingerprint images into a plurality of second sub-blocks; and updating the binary codebook to include the set of the registered codes by encoding the second sub-blocks based on the coded model, for each of the enrolled fingerprint images.

The dividing of each of the enrolled fingerprint images into the second sub-blocks may include changing at least one of a position or an angle at which each of the enrolled fingerprint images is to be cropped, and dividing each of the enrolled fingerprint images into the second sub-blocks.

The user authentication method may further include storing the binary codebook for the user.

According to another general aspect, a method of generating a coded model for a user includes dividing each of a plurality of fingerprint images included in a database (DB) into a plurality of sub-blocks with a predetermined size; training a deep neural network comprising at least one processor via deep learning of the sub-blocks of the fingerprint images; generating a plurality of classes by selectively grouping the sub-blocks based on the trained deep neural network; and generating a coded model operably configured to classify sub-blocks of captured fingerprint images into corresponding classes.

The dividing of each of the fingerprint images into the sub-blocks may include changing either one or both of a position or an angle parameter at which each of the fingerprint images is to be cropped, and dividing each of the fingerprint images into the sub-blocks based on the changed cropping parameter.

The fingerprint images may include at least one of fingerprint images of a plurality of users or fingerprint images of a plurality of fingers of a plurality of users.

The generating of the classes may include calculating a similarity between the sub-blocks; and clustering the sub-blocks into groups with substantially unique feature patterns based on the similarity.

The calculating of the similarity may include calculating an orientation distance between the sub-blocks based on a dominant direction between the sub-blocks and a normalized cross correlation (NCC) value between the sub-blocks; and calculating the similarity based on the orientation distance.

The method may further include assigning a unique identification (ID) to each of the classes.

The generating of the coded model may include generating the coded model by training a parameter of a deep neural network so that a class to which each of the sub-blocks belongs is output in response to an input of each of the sub-blocks.

A non-transitory computer-readable storage medium may store instructions that, when executed by a processor, cause the processor to perform the method.

Each of the captured fingerprint images may include a substantially full or a partial fingerprint of a user captured by a fingerprint scanner.

According to another general aspect, a user authentication apparatus includes a communication interface configured to receive at least a portion of a fingerprint image of a user; a memory configured to store a coded model; and a processor coupled to the communication interface and the memory and configured: to divide the fingerprint image into a plurality of first sub-blocks, to generate a set of input codes by encoding the first sub-blocks based on the coded model, and to authenticate the user based on a similarity measured between the set of the input codes and a set of registered codes included in a pre-registered binary codebook.

Other features and aspects will be apparent from the following detailed description, the drawings, and the claims.

BRIEF DESCRIPTION OF THE DRAWINGS

FIG. 2 illustrates an example of a method of generating a coded model.

FIG. 6 illustrates an example of a method of generating a plurality of classes by grouping a plurality of sub-blocks.

Figure 1A:
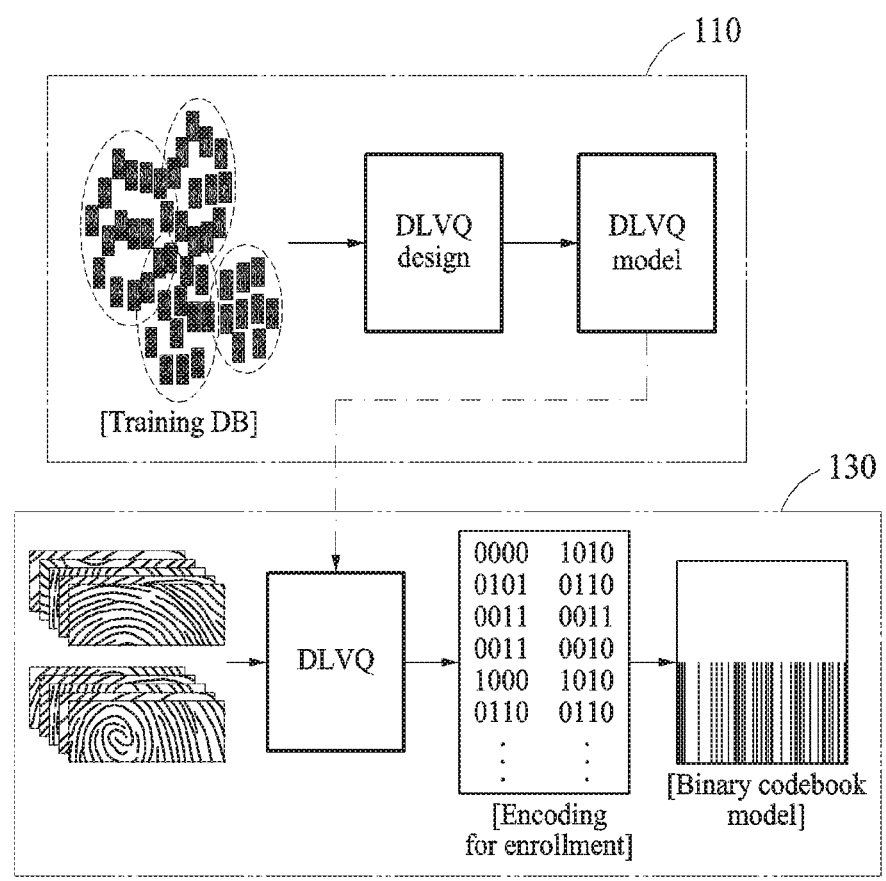
FIGS. 1A and 1B illustrate an example of a user authentication method using a coded model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after such thorough understanding of the disclosure of this application has been gained by one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component.

It will be understood that when a component is referred to as being "connected to" another component, the component is directly connected or coupled to the other component or intervening components may be present. However, when a component is described as being "directly" connected or coupled to another component, there are no intervening components present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

In the following description, examples are used to authenticate a user based on a fingerprint image of the user. Embodiments may be implemented as various products, for example, personal computers (PC), laptop computers, tablet computers, smartphones, televisions (TVs), smart home appliances, intelligent vehicles, kiosks or wearable devices. For example, embodiments may be employed to authenticate a user in a smartphone, a mobile device or a smart home system. Embodiments may be applicable to a payment service by user authentication. Also, embodiments may be applicable to an intelligent vehicle system for automatically starting a vehicle by authenticating a user. Hereinafter, examples will be described in detail below with reference to the accompanying drawings, and like reference numerals refer to the like elements throughout.

Figure 1B:
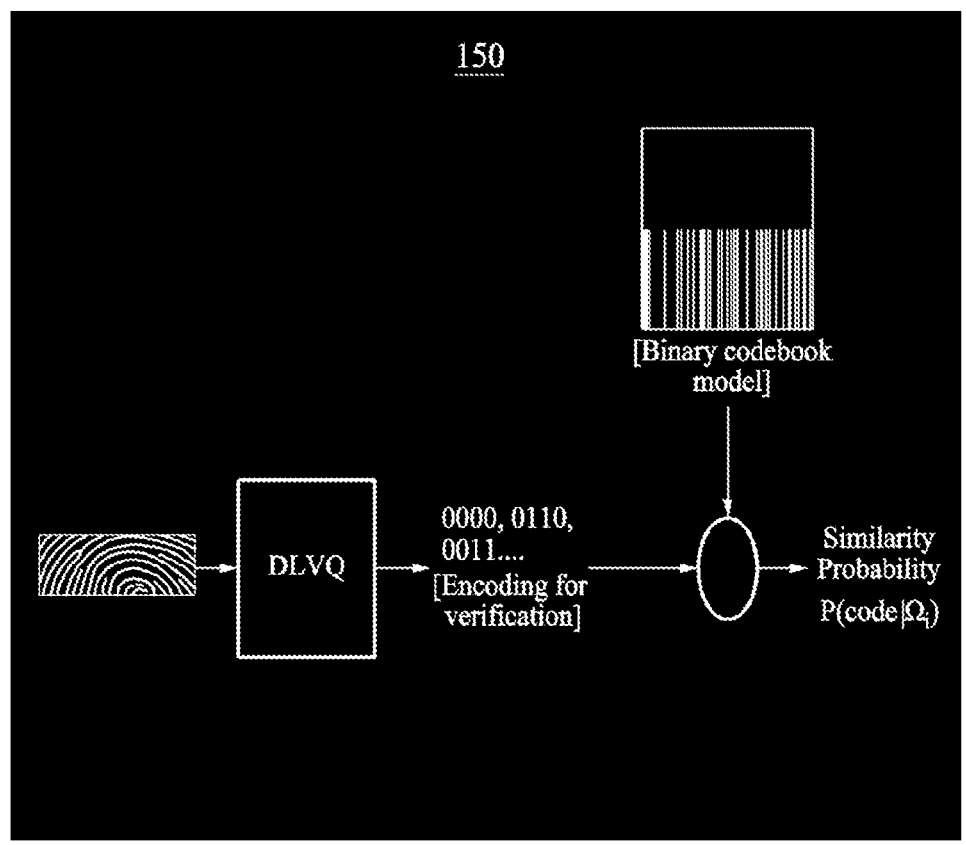

FIGS. 1A and 1B illustrate an example of a user authentication method using a coded model. FIG. 1A illustrates process 110 of generating a coded model based on training data corresponding to an offline process that is performed in advance, and process 130 of generating a binary codebook for enrolled fingerprint images based on the coded model.

Due in part to the fact that partial fingerprint images are generally acquired at arbitrary angles and arbitrary positions of a finger, it is often difficult to find a single point for normalization, for example, an eye or a nose of a face. Also, a single partial fingerprint image has various patterns, and accordingly patterns of partial fingerprint images are different from each other based on positions and angles even though the partial fingerprint images are acquired from the same finger of the same person.

According to an example, a training database (DB) suitable for training of images with various patterns, for example, fingerprints, is, according to one or more embodiments, automatically configured and a codebook for enrolled partial fingerprints is generated through training. Thus, it is possible to enhance a recognition rate of a partial fingerprint and possible to cope with fingerprint images with various qualities sensed by sensors with different sizes, instead of performing individual tuning or changing an algorithm.

In FIG. 1A, process 110 is performed by an apparatus for generating a coded model (hereinafter, referred to as a "generation apparatus").

The generation apparatus divides a large quantity of partial fingerprint images into N×N sub-blocks corresponding to various positions and angles. The partial fingerprint images are included in a training database (DB) for deep learning. The generation apparatus clusters the sub-blocks into groups with unique patterns for deep learning.

The generation apparatus assigns a unique identification (ID) to each of the groups, trains each of the groups on unique patterns of fingerprints through deep learning, and generates a coded model. The coded model corresponds to a result obtained by deep learning of a plurality of fingerprint images. The coded model is, for example, a deep learning vector quantization (DLVQ) model. Through the above-described process, the generation apparatus automatically configures a training DB suitable for training of partial fingerprint images with different sizes and variable patterns, and accordingly the sub-blocks are automatically classified into groups to have unique patterns.

In FIG. 1A, a DLVQ indicates a deep learning process, and the DLVQ model corresponds to a result obtained by deep learning and indicates a prediction process of predicting a class to which sub-blocks belong. An example of process 110 will be further described with reference to FIGS. 2 through 9.

Process 130 is a process of enrolling a fingerprint of a user and is performed by a user authentication apparatus (hereinafter, referred to as an "authentication apparatus"). The authentication apparatus generates a binary codebook for enrolled fingerprint images of a user through training based on the coded model generated in process 110. The enrolled fingerprint images include enrolled partial fingerprint images.

For example, when a user enrolls partial fingerprint images of a plurality of users in a mobile terminal, the authentication apparatus encodes sub-blocks of the enrolled partial fingerprint images based on the coded model generated in process 110. The authentication apparatus encodes, or quantizes, the sub-blocks of the enrolled partial fingerprint images for each feature pattern, and stores coded numbers obtained by the encoding in a binary codebook or a binary codebook model for each user or for each finger. An enrolled fingerprint image of a user that is encoded is stored in a mobile device in a form of a binary codebook or a binary codebook model that is a set of encoded values. An example of process 130 will be further described with reference to FIGS. 11, 13, 14 and 15.

FIG. 1B illustrates process 150 of authenticating a user based on a fingerprint image for authentication of the user. Process 150 corresponds to, for example, an online process.

Process 150 is a process of authenticating an actual user based on a fingerprint image of a user input for authentication and is performed by an authentication apparatus. In the following description, a fingerprint image of a user input for authentication is referred to as an "authentication fingerprint image."

When an authentication fingerprint image is received, the authentication apparatus encodes, or quantizes, the authentication fingerprint image based on a coded model, for example, a DLVQ model, that is a deep learning result. The authentication fingerprint image includes a whole fingerprint image or a partial fingerprint image.

The authentication apparatus determines a similarity between a set of registered codes in a pre-registered binary codebook that is information of enrolled fingerprints and a result obtained by encoding the authentication fingerprint image, and authenticates a user. To determine the similarity, the authentication apparatus uses, for example, a Bayesian probability. Process 150 will be further described with reference to FIGS. 10, 16 and 17.

FIG. 2 illustrates an example of a method of generating a coded model. Referring to FIG. 2, in operation 210, a generation apparatus divides each of a plurality of fingerprint images included in a DB into a plurality of sub-blocks. The DB is, for example, the above-described training DB. The plurality of fingerprint images include at least one of fingerprint images of a plurality of users or fingerprint images of a plurality of fingers of a plurality of users. For example, the generation apparatus changes at least one of a position or an angle at which the plurality of fingerprint images are to be cropped and divides each of the plurality of fingerprint images into the plurality of sub-blocks. An example of a method of dividing each of a plurality of fingerprint images into a plurality of sub-blocks in the generation apparatus will be further described with reference to FIGS. 4 and 5.

In operation 220, the generation apparatus generates a plurality of classes by grouping the sub-blocks. An example of a method of generating a plurality of classes in the generation apparatus will be further described with reference to FIG. 3.

Figure 9:
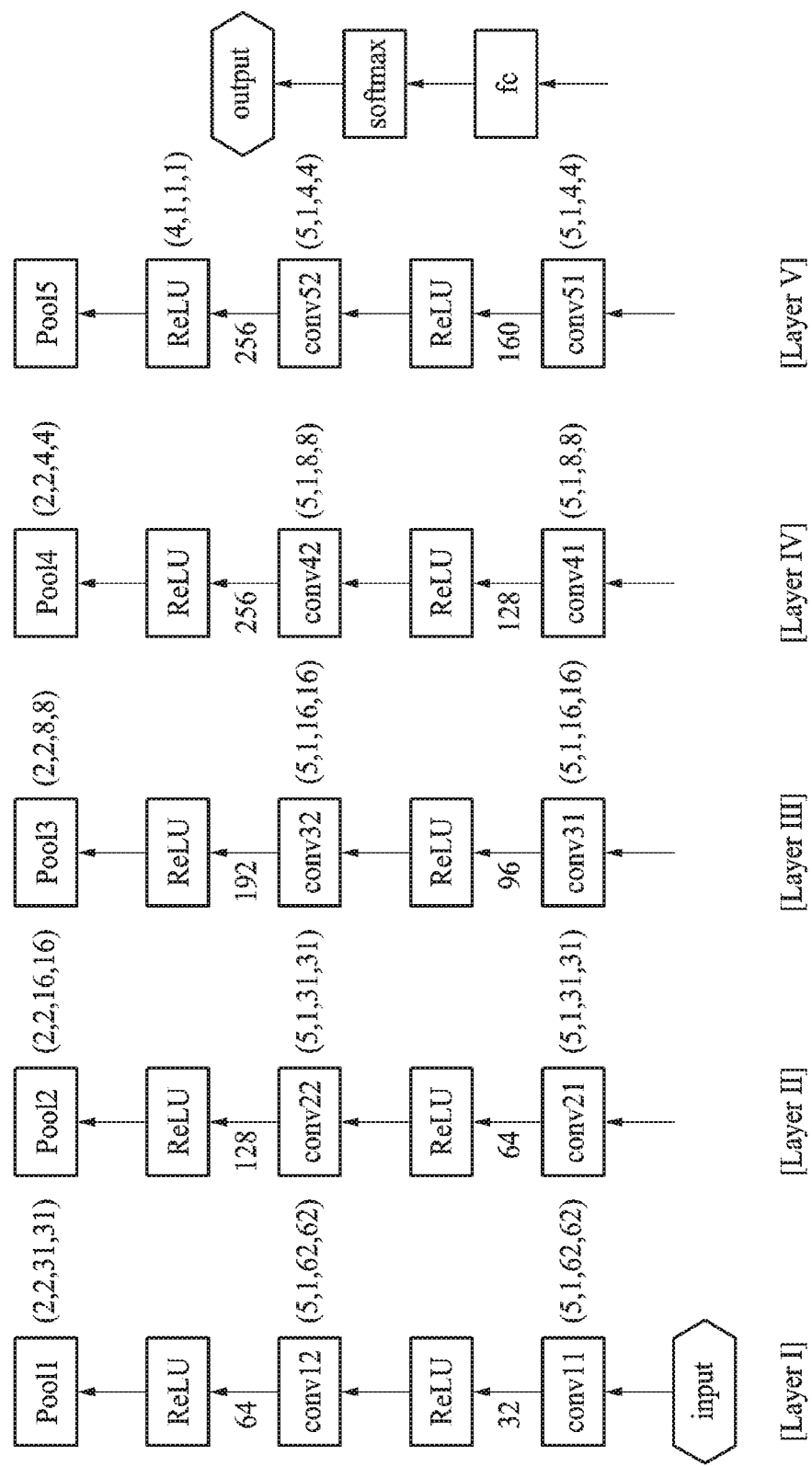
FIG. 9 illustrates an example of a structure of a deep neural network used to generate a coded model.

In operation 230, the generation apparatus generates a coded model used to classify the sub-blocks into corresponding classes. For example, the generation apparatus trains a parameter of a deep neural network so that a class to which each of the sub-blocks belongs is output in response to an input of each of the sub-blocks, and generates the coded model. An example of a structure of the deep neural network is shown in FIG. 9.

Figure 3:
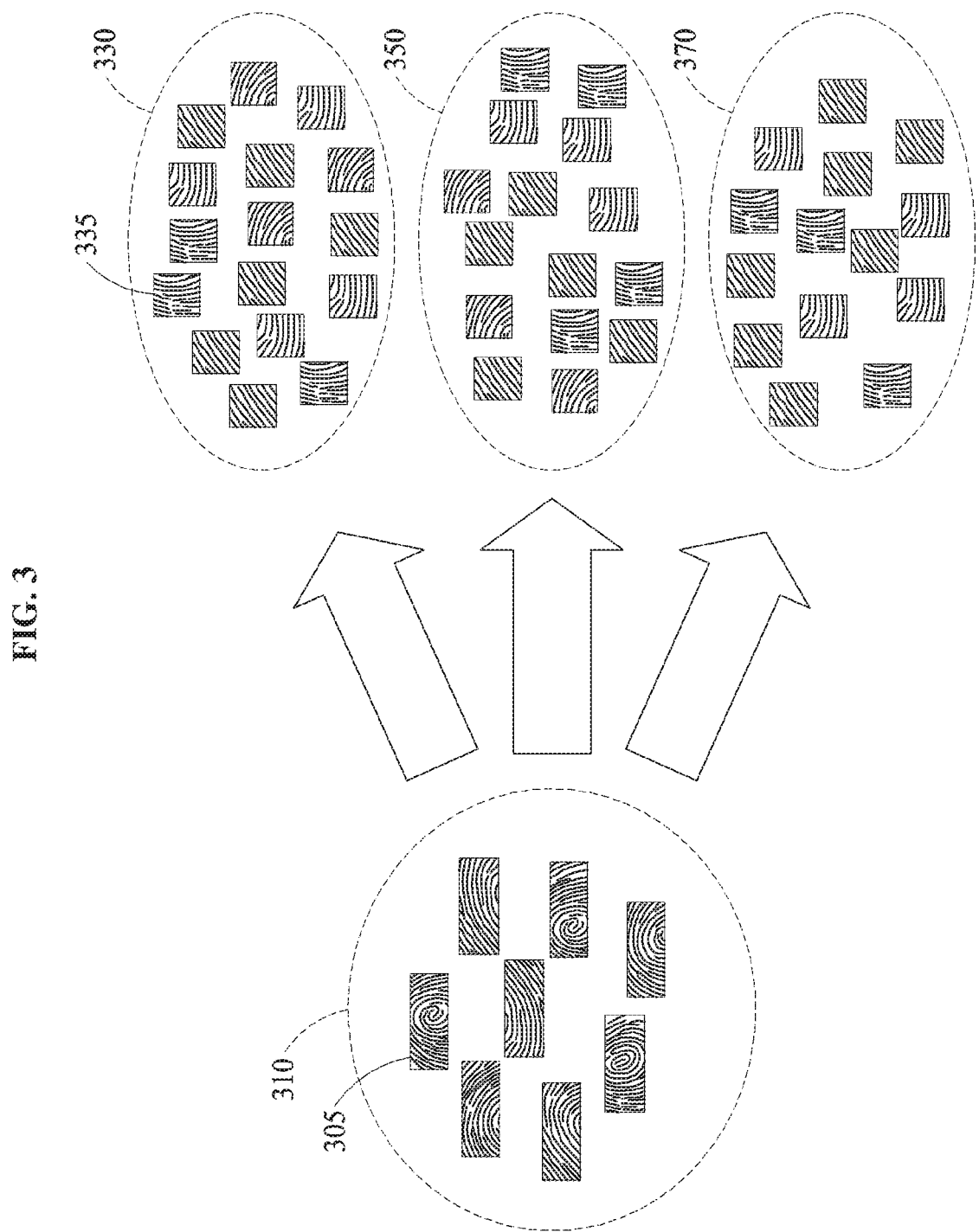
FIG. 3 illustrates an example of a method of generating a plurality of classes by grouping a plurality of sub-blocks from a plurality of partial fingerprint images.

FIG. 3 illustrates an example of a method of generating a plurality of classes by grouping a plurality of sub-blocks from a plurality of partial fingerprint images. Referring to FIG. 3, each of a plurality of partial fingerprint images 305 for training included in a large capacity partial fingerprint DB 310 is divided into a plurality of sub-blocks 335. The plurality of partial fingerprint images 305 correspond to partial fingerprints with arbitrary rotation, scaling and translation (RST) components.

The generation apparatus generates a plurality of classes, for example, classes 330, 350 and 370, by grouping the plurality of sub-blocks 335 for each of images with uniformity. The "images with the uniformity" are understood as, for example, images perceived to have the same degree of transformation despite a slight difference in scales of images or a slight translation or rotation of images.

The generation apparatus calculates a similarity between sub-blocks and clusters the sub-blocks into groups with unique feature patterns based on the similarity. An example of a method of calculating a similarity between sub-blocks in the generation apparatus will be described with reference to FIGS. 6, 7 and 8.

The generation apparatus assigns a unique ID to each of the plurality of classes. For example, the generation apparatus assigns IDs of "1", "2" and "3" to the classes 330, 350 and 370, respectively. The unique ID is a code used to identify a single class and corresponds to an index for training.

Figure 4:
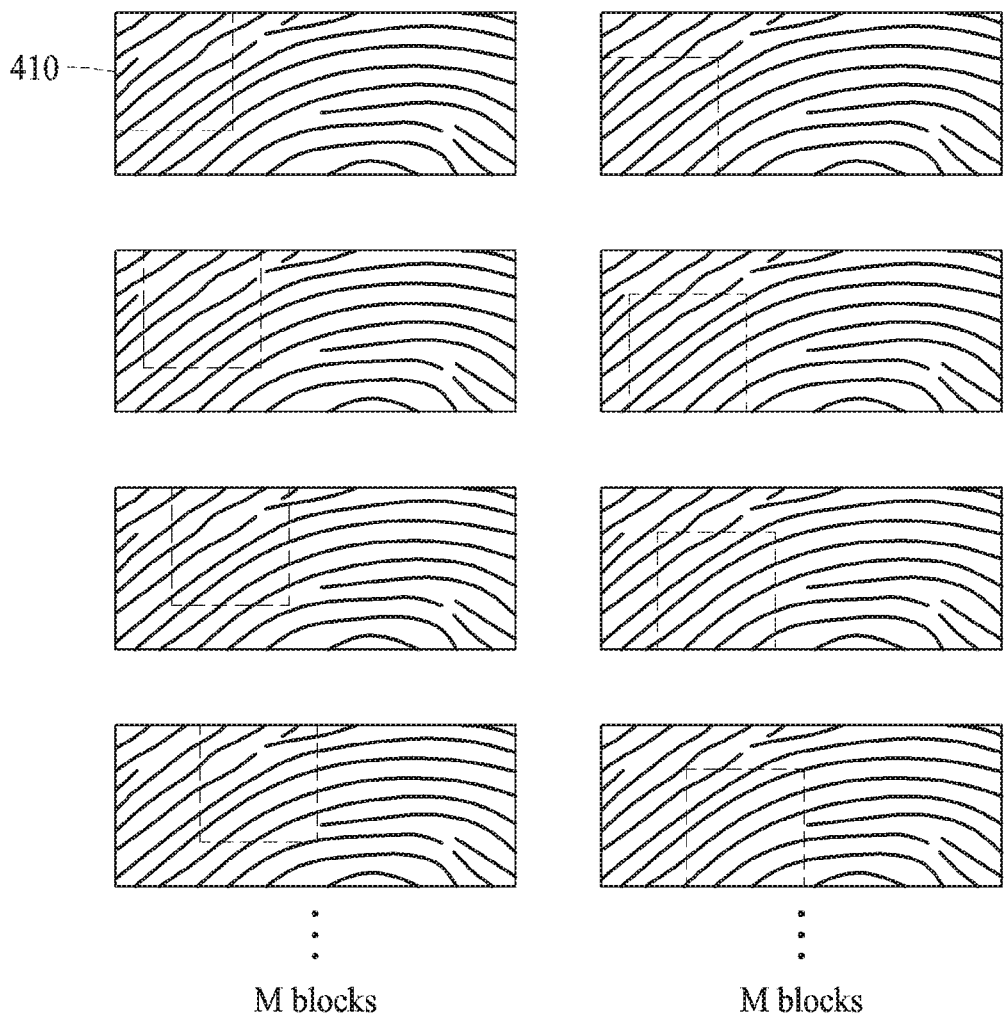
FIGS. 4 and 5 illustrate an example of a method of dividing each of a plurality of fingerprint images into a plurality of sub-blocks.
Figure 5:
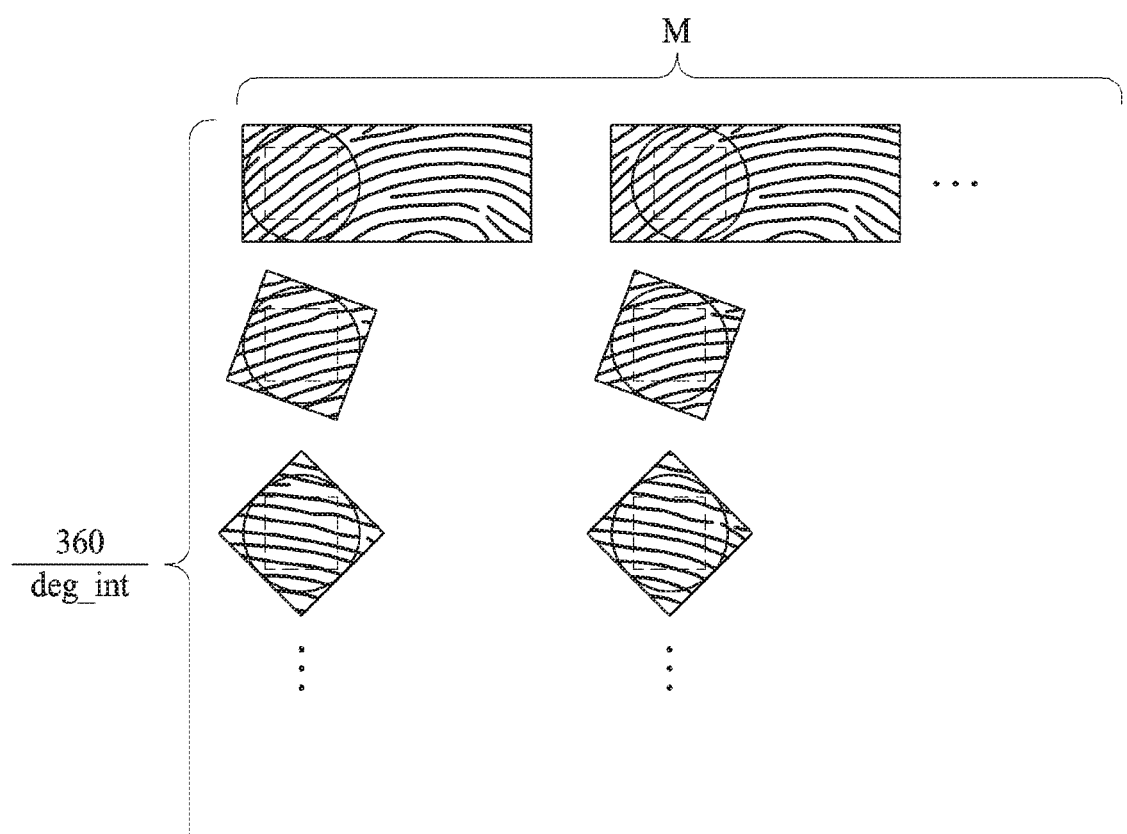

FIGS. 4 and 5 illustrate an example of a method of dividing each of a plurality of fingerprint images into a plurality of sub-blocks. FIG. 4 illustrates a process of cropping a single partial fingerprint image into a plurality of sub-blocks 410 to be invariant to translation. FIG. 5 illustrates a process of cropping a single partial fingerprint image into a plurality of sub-blocks to be invariant to rotation.

A single partial fingerprint image has various translation and rotation components. Accordingly, a generation apparatus performs cropping to create N×N sub-blocks based on various positions and directions to be invariant to all translations and rotations. For example, during unsupervised learning, N×N sub-blocks are obtained by performing cropping to facilitate clustering. The N×N sub-blocks correspond to candidate sub-blocks for generation of a training DB.

N denotes a cropping size, and M denotes a number of sub-blocks that are obtained by cropping a partial fingerprint image and that are allowed to horizontally overlap. Also, deg_int denotes a unit of rotation.

As described above, the generation apparatus divides each of a plurality of fingerprint images included in a DB into a plurality of sub-blocks by changing at least one of a position or an angle at which each of the plurality of fingerprint images is to be cropped.

FIG. 6 illustrates an example of a method of generating a plurality of classes by grouping a plurality of sub-blocks. In FIG. 6, a top portion 610 illustrates a scheme of calculating a normalized cross correlation (NCC) score between sub-blocks, and a bottom portion 630 illustrates a scheme of calculating an orientation distance between sub-blocks.

A generation apparatus calculates a similarity between sub-blocks.

For example, the generation apparatus calculates an orientation distance between the sub-blocks based on an NCC score between the sub-blocks and a dominant direction $D_{orien}$ between the sub-blocks.

The generation apparatus calculates a similarity between the sub-blocks based on the orientation distance. The NCC score indicates a distance between fingerprint images and is obtained using Equation 1 shown below. The dominant direction $D_{orien}$ is obtained using Equation 2 shown below.

$$NCC(I_1, I_2) = \frac{\sum_{x,y}(I_1(x,y) \cdot I_2(x+\nabla x, y+\nabla y))}{\sqrt{\sum_{x,y}I_1(x,y)^2 \cdot \sum_{x,y}I_2(x+\nabla x, y+\nabla y)^2}} \quad \text{[Equation 1]}$$

In Equation 1, x and y denote a coordinate for an x-axis of a pixel in an image, that is, a horizontal axis, and a coordinate for a y-axis, that is, a vertical axis, of the pixel, respectively.

Also, $I_1(x,y)$ denotes sub-blocks of an enrolled fingerprint image and $I_2(x,y)$ denotes sub-blocks of an authentication fingerprint image. In addition, $\nabla x$ and $\nabla y$ have a value of "0."

A general NCC score with $\nabla x$ and $\nabla y$ having the value of "0" is obtained using Equation 1.

To calculate an orientation distance between fingerprint images, the generation apparatus performs an orientation estimation of the fingerprint images and calculates a dominant direction of w×w sub-blocks.

The generation apparatus calculates a directivity (that is, a dominant direction between sub-blocks) of a fingerprint image with a ridge and a valley using Equation 2 shown below.

$$v_x(x,y) = \sum_{u=x-w/2}^{x+w/2} \sum_{v=y-w/2}^{y+w/2} 2\partial_x(u,v)\partial_y(u,v) \quad \text{[Equation 2]}$$

$$v_y(x,y) = \sum_{u=x-w/2}^{x+w/2} \sum_{v=y-w/2}^{y+w/2} (\partial_x^2(u,v) - \partial_y^2(u,v))$$

$$\phi(x,y) = \frac{1}{2}\tan^{-1}\left(\frac{v_x(x,y)}{v_y(x,y)}\right)$$

$$D_{orien}(I_1, I_2) = \phi_1 \circ \phi_2$$

In Equation 2, x and y denote an abscissa and an ordinate, respectively, and w denotes an average length of a single side of a sub-block.

Also, $v_x(x,y)$ denotes an estimate of a local orientation in an x-axis direction in the w×w sub-blocks, and $v_y(x,y)$ denotes an estimate of a local orientation in a y-axis direction in the w×w sub-blocks.

$\partial_x(u,v)$ denotes a horizontal gradient operator and $\partial_y(u,v)$ denotes a vertical gradient operator.

$\phi(x,y)$ denotes a local orientation in the w×w sub-blocks.

$\phi_1$ denotes a local orientation for w×w sub-blocks of an image $\phi_2$ and denotes a local orientation for w×w sub-blocks of an image 12.

In addition, o denotes a piecewise orientation difference.

The generation apparatus calculates the similarity based on an orientation distance calculated using Equation 3 shown below, and clusters sub-blocks with unique patterns into groups from partial fingerprints based on the calculated similarity, to perform deep learning.

$$D(I_1,I_2)=NCC(I_1,I_2)+\alpha D_{orien}(I_1,I_2) \quad \text{[Equation 3]}$$

In Equation 3, $I_1$ and $I_2$ denote two sub-blocks to be compared, and a has a value greater than "1."

Figure 7:
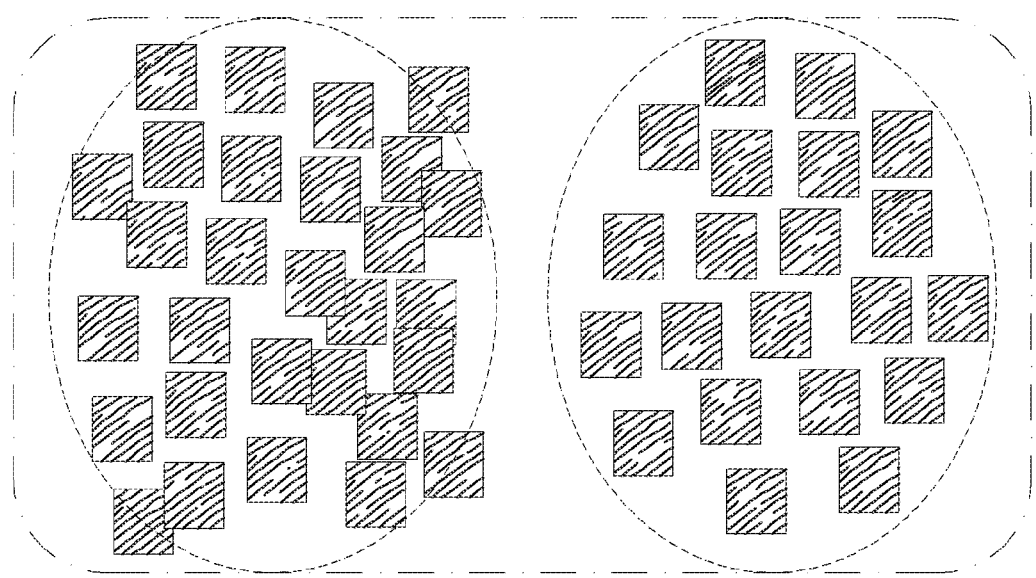
FIG. 7 illustrates N×N sub-blocks acquired from a fingerprint image of the same finger, according to one or more embodiments.

The dominant direction is calculated using Equation 2 in calculation of the orientation distance, to prevent a deep neural network from being improperly trained due to similar fingerprint patterns despite a great NCC score between two sub-blocks as shown in FIG. 7.

The generation apparatus calculates the similarity between the sub-blocks based on the orientation distance calculated using Equation 3. For example, when a large orientation distance is calculated, a similarity between sub-blocks decreases. When a short orientation distance is calculated, the similarity between the sub-blocks increases.

The generation apparatus clusters the sub-blocks into groups with unique feature patterns based on the calculated similarity, and generates a plurality of classes. The generation apparatus uses, for example, K-mean clustering to cluster the sub-blocks. An example of a method of clustering sub-blocks using K-mean clustering in the generation apparatus will be further described with reference to FIG. 8.

FIG. 7 illustrates N×N sub-blocks acquired from a fingerprint image of the same finger. In FIG. 7, a left group and a right group of the sub-blocks indicate that the sub-blocks are at a small orientation distance from each other despite a large NCC distance between the sub-blocks.

Figure 8:
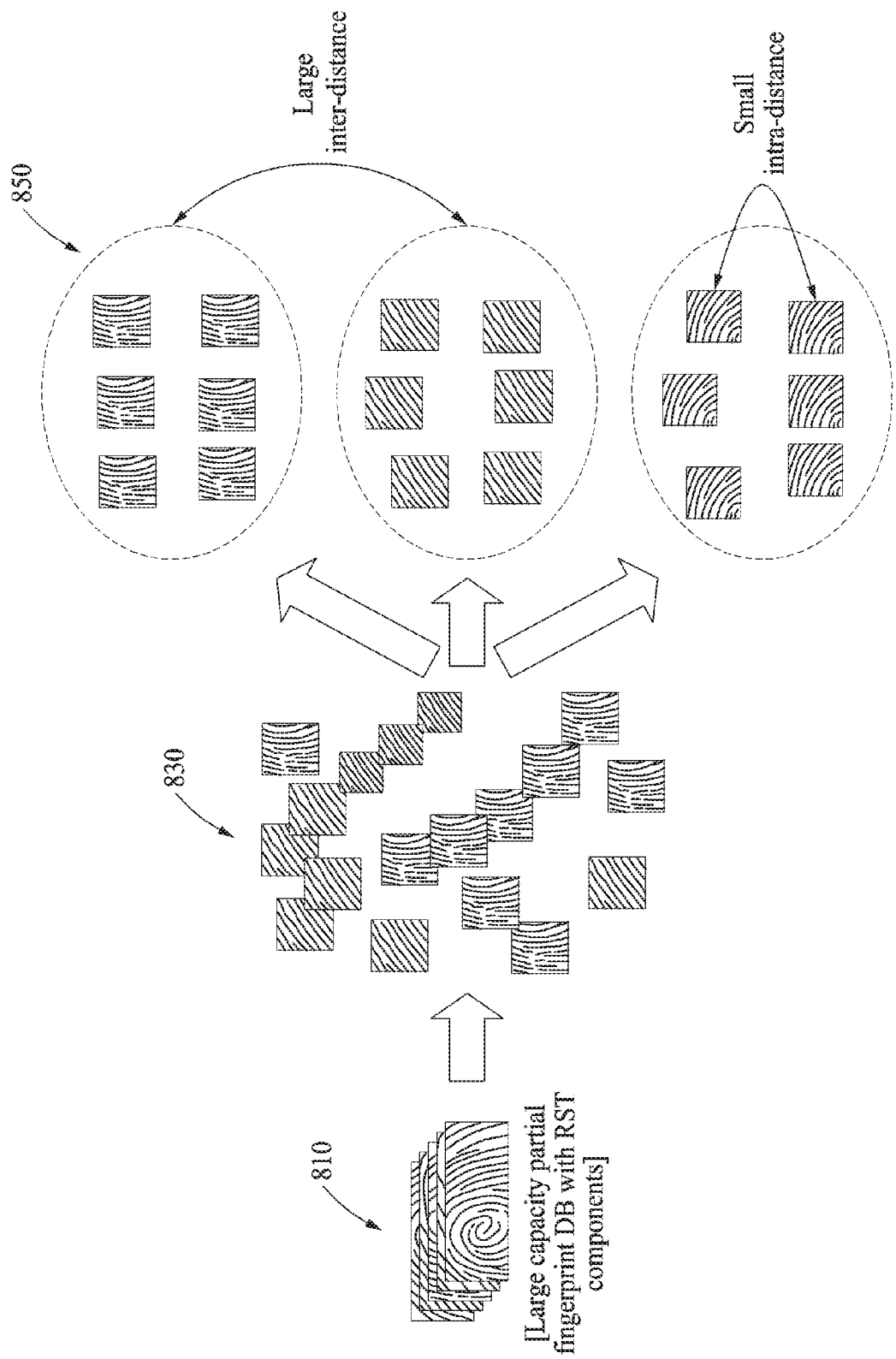
FIG. 8 illustrates an example of a process of automatically generating a training database (DB) for deep learning using a large capacity fingerprint DB.

FIG. 8 illustrates an example of a process of automatically generating a training DB for deep learning using a large capacity fingerprint DB.

Referring to FIG. 8, a generation apparatus creates sub-blocks 830 by dividing a large quantity of partial fingerprint images 810 included in a partial fingerprint DB, and groups the sub-blocks 830 into a plurality of classes 850 (or clusters) based on the orientation distance calculated using Equation 3 and a clustering scheme, to automatically generate a training DB for deep learning. The generation apparatus assigns an index for training to each of the classes 850.

The generation apparatus removes a feature block with a low frequency from the plurality of classes 850 using Equation 4 shown below.

$$R_{idx} = \operatorname*{argmin}_{k}(nE_k) \quad \text{[Equation 4]}$$

In Equation 4, $nE_k$ denotes a number of elements in a class (or a cluster) with an index k.

A longer period of time is required to train a model in response to a larger number of types of features that need to be remembered, and it is difficult to properly train features with a relatively low frequency because there are not many examples of situations in which the features are shown. Thus, the generation apparatus may remove feature blocks with a relatively low frequency, to enhance a training efficiency.

A large inter-distance between the classes 850, and a small intra-distance between the sub-blocks 830 in the classes 850 are provided.

FIG. 9 illustrates an example of a structure of a deep neural network used to generate a coded model.

A generation apparatus generates a coded model by training parameters of a 5-layer deep neural network so that a class to which each of sub-blocks belongs is output in response to an input of each of the sub-blocks. In FIG. 9, values in parenthesis indicate a kernel size, a stride, a width and a height.

Figure 10:
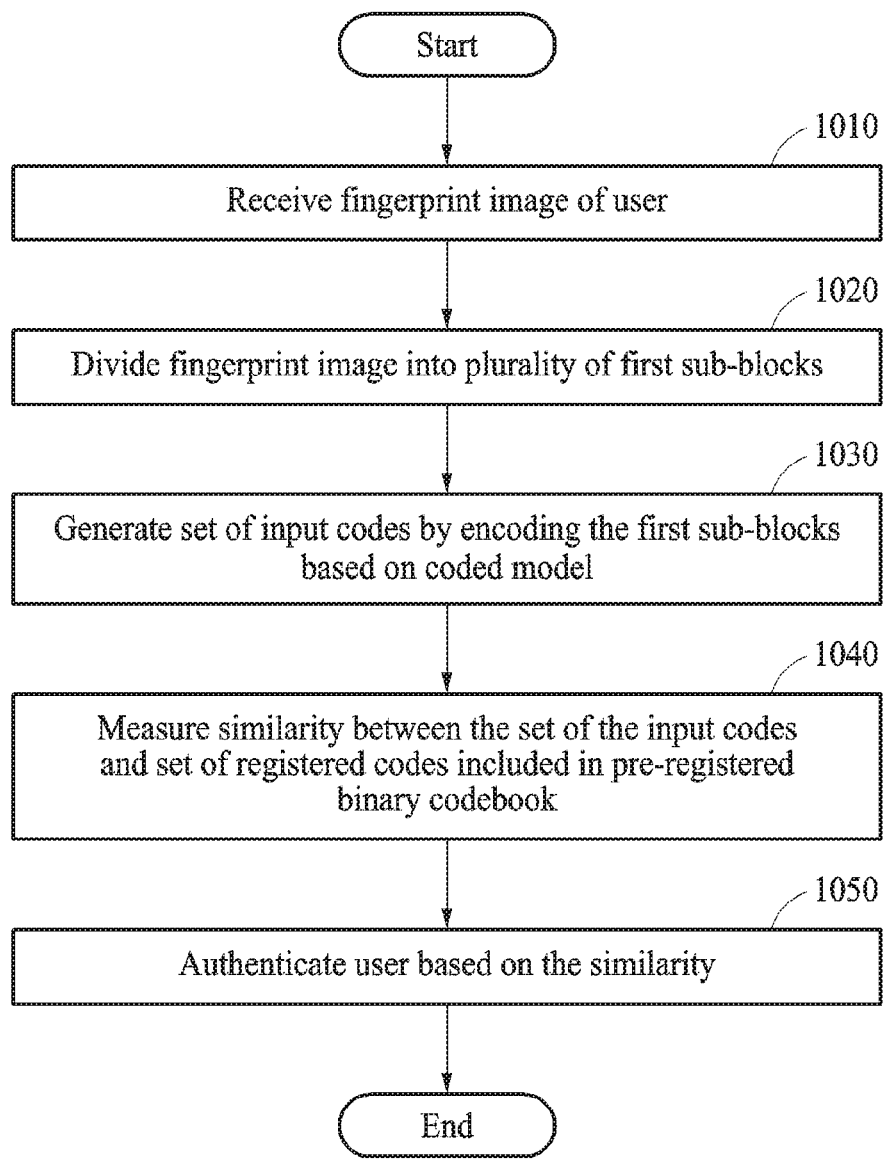
FIG. 10 illustrates an example of a user authentication method based on a fingerprint image.

FIG. 10 illustrates an example of a user authentication method based on a fingerprint image. Referring to FIG. 10, in operation 1010, an authentication apparatus receives a fingerprint image of a user. The fingerprint image is acquired using a fingerprint sensor. The fingerprint sensor includes, for example, a capacitive fingerprint sensor, an optical fingerprint sensor or an ultrasonic fingerprint sensor.

The fingerprint sensor acquires a partial fingerprint or a whole fingerprint of a user. The fingerprint image includes a partial fingerprint in addition to a whole fingerprint of a user. The fingerprint image has arbitrary RST components.

In operation 1020, the authentication apparatus divides the fingerprint image into a plurality of first sub-blocks. In an example, the authentication apparatus divides the fingerprint image into the first sub-blocks so that cropped portions of the fingerprint image overlap. In another example, the authentication apparatus divides the fingerprint image into the first sub-blocks so that cropped portions of the fingerprint image do not overlap. The first sub-blocks correspond to sub-blocks obtained by dividing an authentication fingerprint image of a user received for real-time authentication. Similarly to the above-described generation apparatus, the authentication apparatus changes at least one of a position or an angle at which the fingerprint image is to be cropped and divides the fingerprint image into the first sub-blocks.

In operation 1030, the authentication apparatus generates a set of input codes by encoding the first sub-blocks based on a coded model. An example of a method of encoding the first sub-blocks based on the coded model in the authentication apparatus will be further described with reference to FIG. 12. The coded model is generated by training a parameter of a deep neural network so that a class to which each of the sub-blocks belongs is output in response to an input of each of the sub-blocks.

The authentication apparatus classifies the first sub-blocks into one of a plurality of classes based on the cropped portions of the fingerprint image. The classes are distinguished from each other. The authentication apparatus generates the set of the input codes by the first sub-blocks encoded based on the classes.

In operation 1040, the authentication apparatus measures a similarity between the set of the input codes and a set of registered codes included in a binary codebook. The binary codebook is generated and registered in advance in a process of enrolling a fingerprint of a user. An example of a method of generating a binary codebook in the authentication apparatus will be further described with reference to FIG. 11. The authentication apparatus measures the similarity based on whether the set of the input codes matches the set of the registered codes in the binary codebook.

In operation 1050, the authentication apparatus authenticates the user based on the similarity measured in operation 1040. An example of a method of measuring the similarity and an example of a method of authenticating the user in the authentication apparatus will be further described with reference to FIG. 17.

Figure 11:
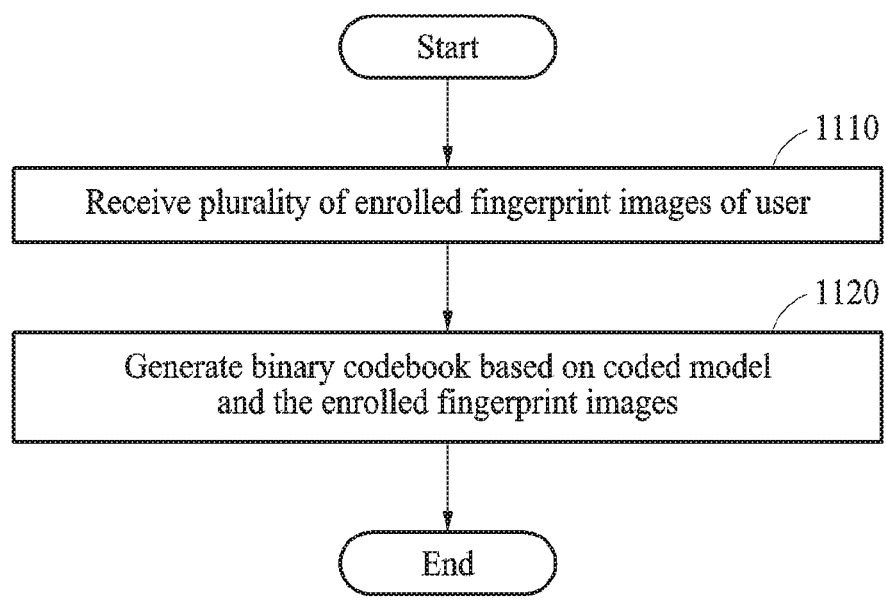
FIG. 11 illustrates an example of a method of generating a binary codebook.

FIG. 11 illustrates an example of a method of generating a binary codebook. Referring to FIG. 11, in operation 1110, an authentication apparatus receives a plurality of enrolled fingerprint images of a user.

In operation 1120, the authentication apparatus generates a binary codebook based on a coded model and the enrolled fingerprint images. For example, the authentication apparatus stores binary codebooks for each user. Even though the authentication apparatus adds fingerprint images of all fingers of the user as enrolled fingerprint images, the binary codebook, instead of actually enrolled fingerprint images, is stored in the authentication apparatus. Thus, a memory usage is not significantly increased even though fingerprint images of fingers are added.

An example of a process of generating a binary codebook corresponding to a single enrolled fingerprint image based on a coded model in the authentication apparatus will be further described with reference to FIG. 13.

Figure 12:
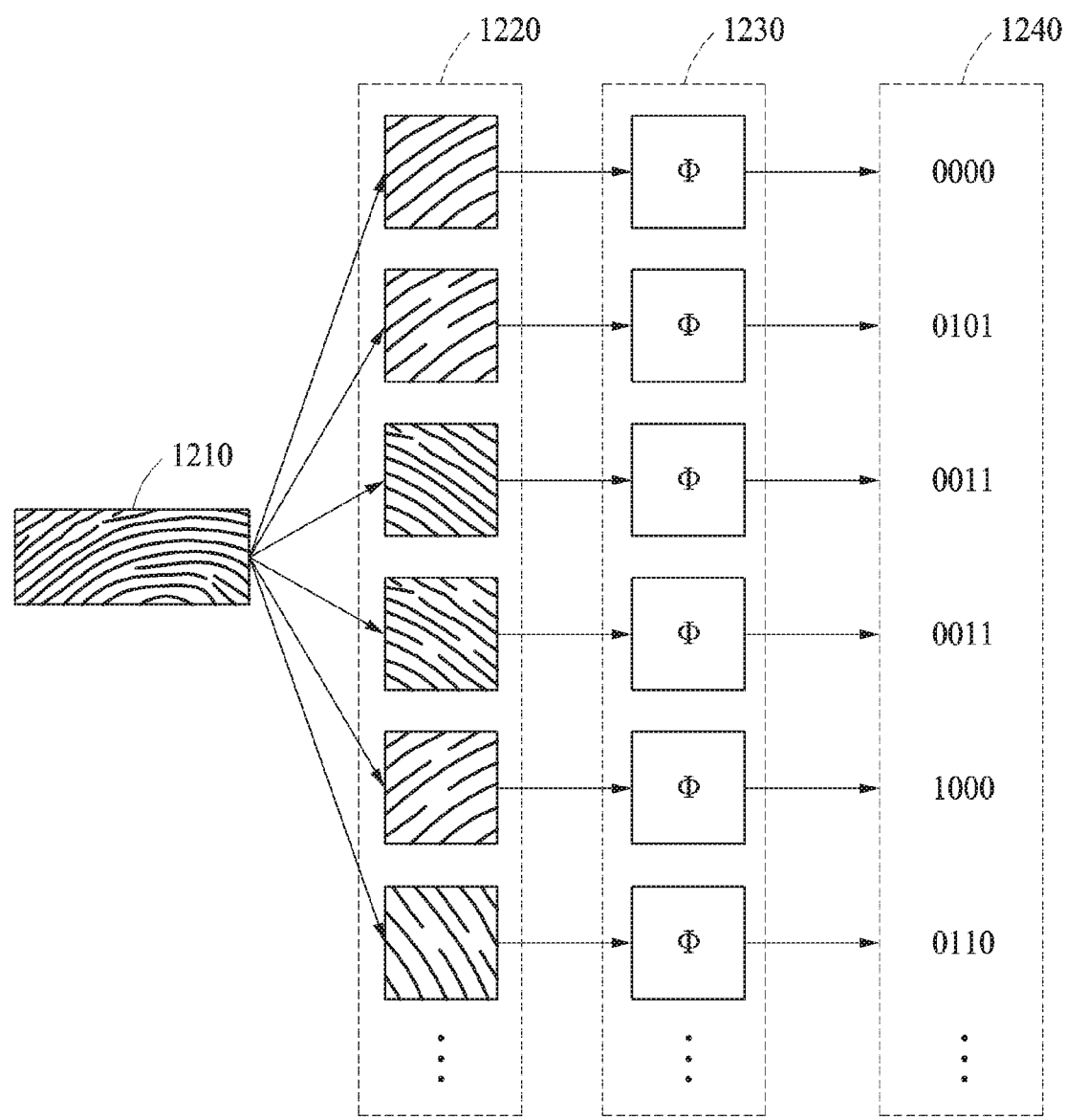
FIG. 12 illustrates an example of a process of encoding a partial fingerprint for authentication.

FIG. 12 illustrates an example of a process of encoding a partial fingerprint for authentication. Referring to FIG. 12, a single partial fingerprint 1210 is encoded based on a coded model φ 1230.

An authentication apparatus crops the partial fingerprint 1210 into N×N sub-blocks 1220 by changing a position at which the partial fingerprint 1210 is to be cropped. The authentication apparatus encodes the sub-blocks 1220 based on the coded model φ 1230. The coded model φ 1230 is, for example, a DLVQ model as a result obtained by training fingerprint images.

The authentication apparatus generates a set of input codes by encoding the sub-blocks 1220 based on the coded model φ 1230.

Figure 13:
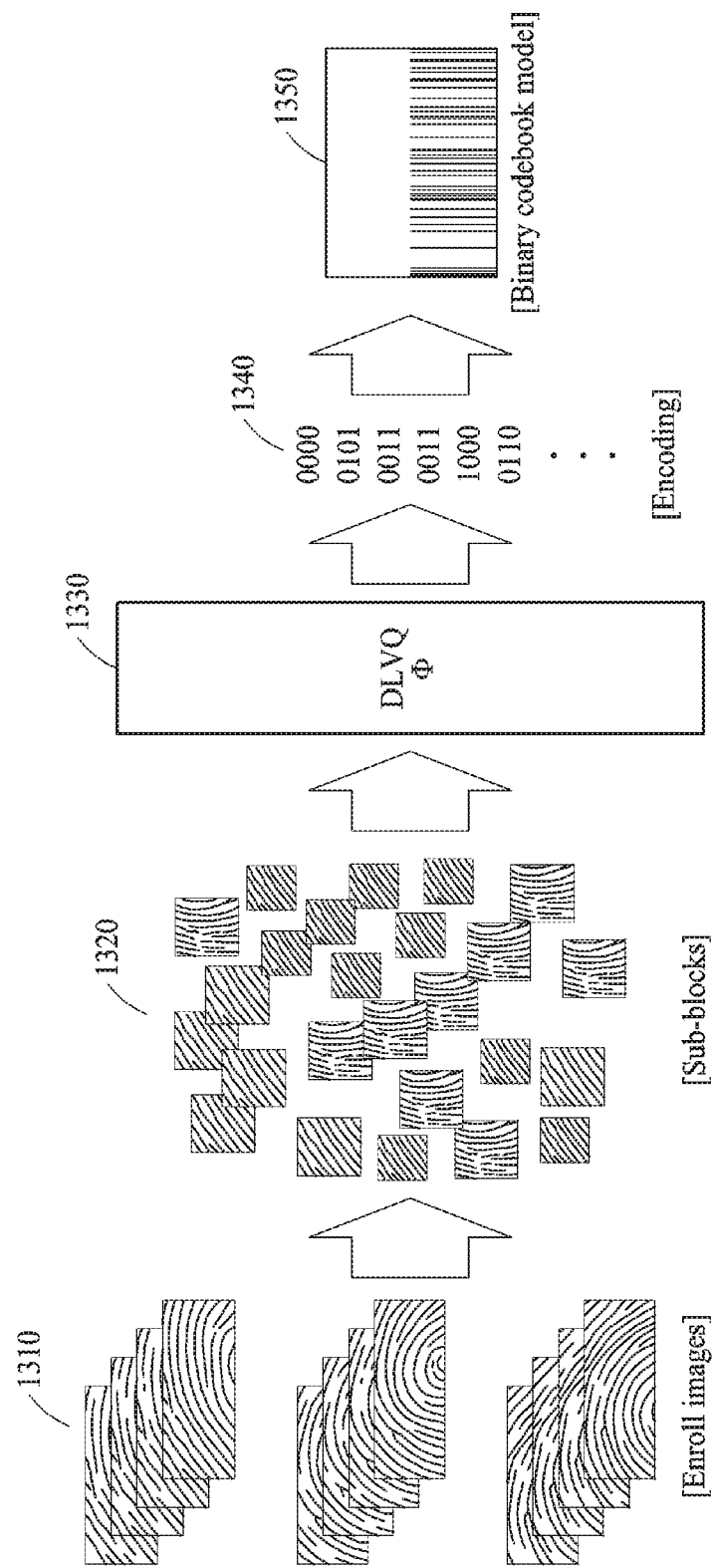
FIG. 13 illustrates an example of a process of generating a binary codebook for enrolled fingerprint images.

FIG. 13 illustrates an example of a process of generating a binary codebook for enrolled fingerprint images. Referring to FIG. 13, a binary codebook 1350 is generated for a plurality of enrolled fingerprint images 1310 of a user.

When the enrolled fingerprint images 1310 are received, an authentication apparatus divides each of the enrolled fingerprint images 1310 into a plurality of second sub-blocks 1320. A "second sub-block" is a sub-block obtained by dividing a fingerprint image of a user for enrollment. The authentication apparatus changes at least one of a position or an angle at which each of the enrolled fingerprint images 1310 is to be cropped, and divides each of the enrolled fingerprint images 1310 into the second sub-blocks 1320.

The authentication apparatus generates and/or updates the binary codebook 1350 to include a set of registered codes 1340 by encoding the second sub-blocks 1320 based on a coded model 1330, for each of the enrolled fingerprint images 1310.

According to an example, by storing a binary codebook corresponding to each of a plurality of enrolled fingerprint images, instead of each of the plurality of enrolled fingerprint images, it is possible to reduce a memory capacity to store an enrolled fingerprint image. Also, by storing a binary codebook instead of directly storing an enrolled fingerprint image, it is possible to prevent fingerprint information of a user from being exposed by hacking.

Figure 14:
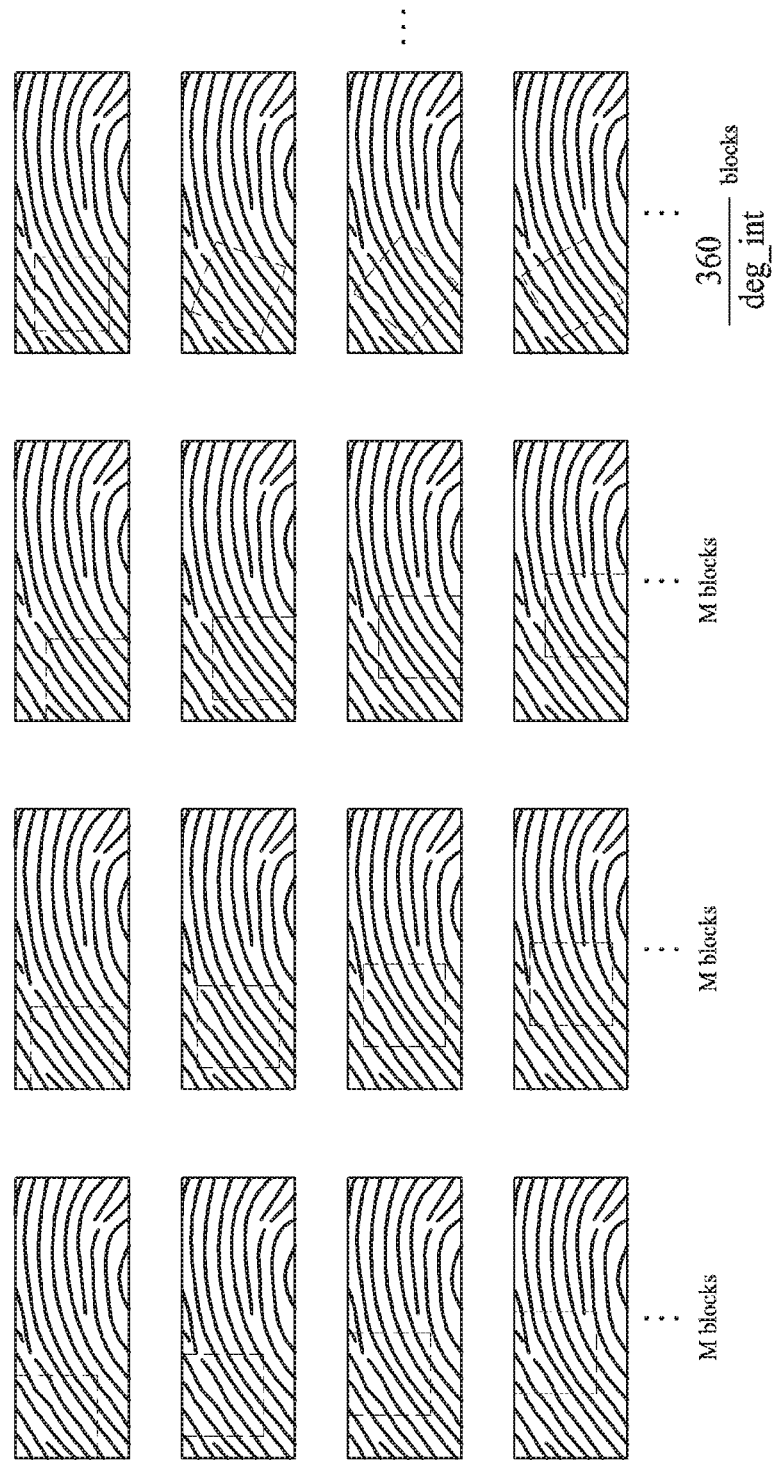
FIG. 14 illustrates an example of a method of dividing a single enrolled fingerprint image into a plurality of sub-blocks based on a position and an angle.

FIG. 14 illustrates an example of a method of dividing a single enrolled fingerprint image into a plurality of sub-blocks based on a position and an angle. Similarly to the generation apparatus described above with reference to FIGS. 4 and 5, an authentication apparatus crops an enrolled fingerprint image into a plurality of sub-blocks to be invariant to translation and rotation.

N denotes a cropping size, and M denotes a number of sub-blocks that are obtained by cropping a partial fingerprint image and that are allowed to horizontally overlap. Also, deg_int denotes a unit of rotation.

Figure 15:
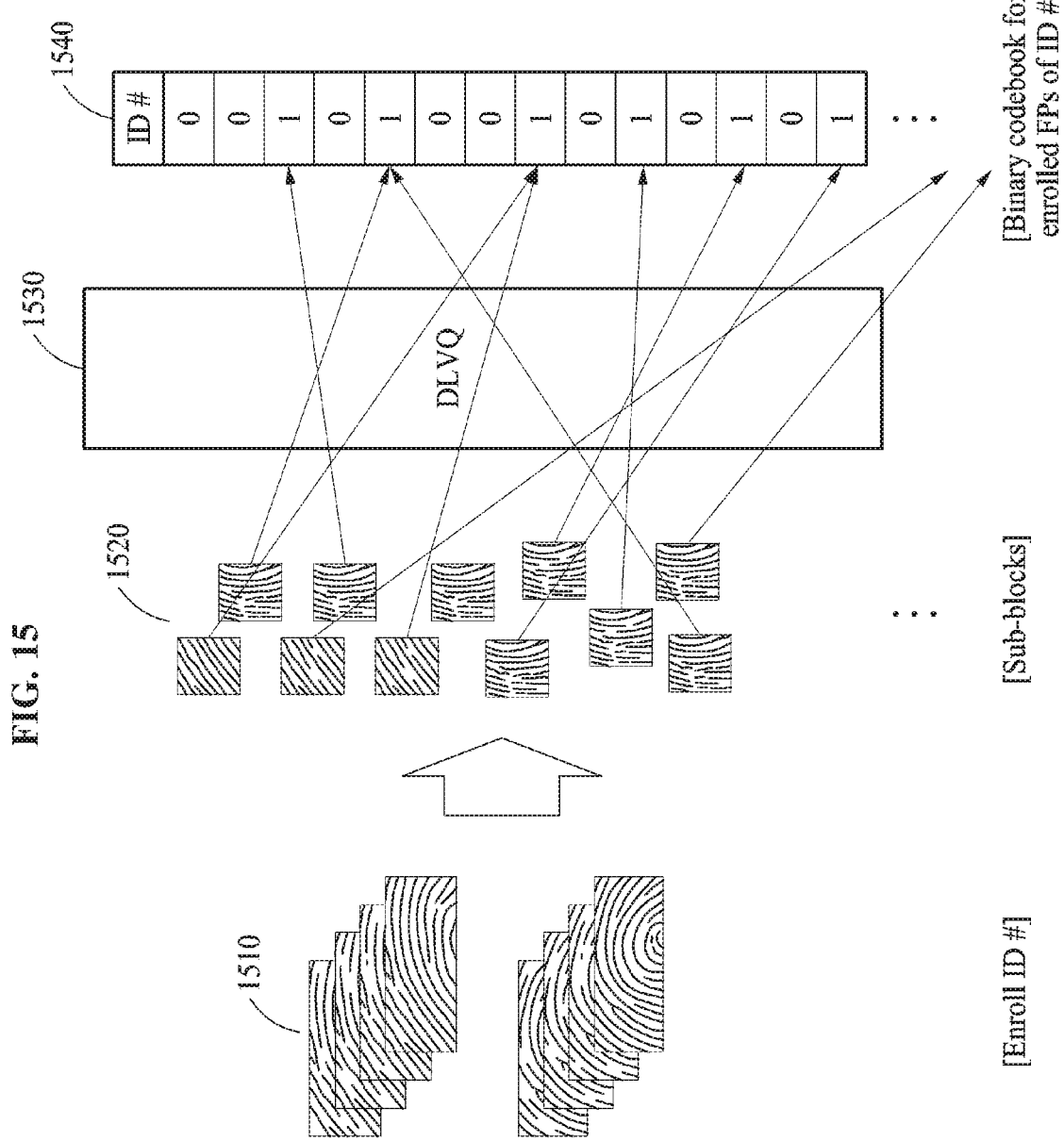
FIG. 15 illustrates an example of a process of generating a binary codebook by applying a coded model to sub-blocks acquired from enrolled images.

FIG. 15 illustrates an example of a process of generating a binary codebook by applying a coded model to sub-blocks acquired from enrolled images. Referring to FIG. 15, a binary codebook 1540 includes a set of registered codes corresponding to a plurality of enrolled partial fingerprint images 1510 with enrollment ID #.

An authentication apparatus divides each of the enrolled partial fingerprint images 1510 into a plurality of second sub-blocks 1520. The authentication apparatus updates the binary codebook 1540 to include a set of registered codes (for example, represented by "00101001010101") by encoding the second sub-blocks 1520 based on a coded model 1530. The binary codebook 1540 is a binary codebook corresponding to the enrolled partial fingerprint images 1510 with enrollment ID #.

Figure 16:
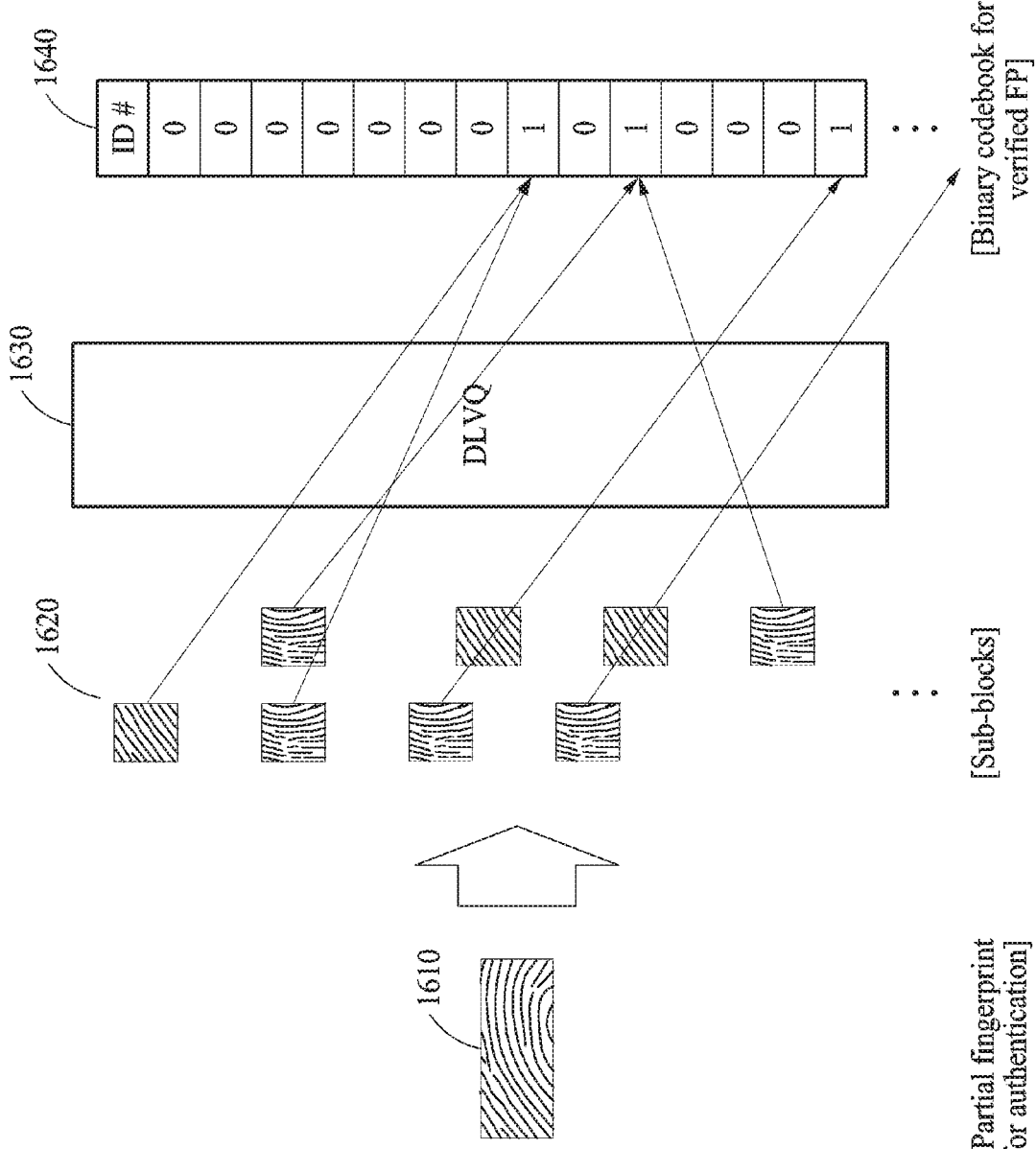
FIG. 16 illustrates an example of a process of encoding a fingerprint image of a user received for authentication based on a coded model.

FIG. 16 illustrates an example of a process of encoding an authentication fingerprint image based on a coded model. Referring to FIG. 16, a set 1640 of input codes is generated by encoding an authentication fingerprint image 1610.

An authentication apparatus divides a partial fingerprint image 1610 into a plurality of first sub-blocks 1620. The authentication apparatus generates the set 1640 of the input codes (for example, represented by "1010001") by encoding the first sub-blocks 1620 based on a coded model 1630. The authentication apparatus classifies the first sub-blocks 1620 into one of a plurality of classes based on cropped portions of the partial fingerprint image 1610, and generates the set 1640 by the first sub-blocks 1620 encoded based on the classes. The classes are distinguished from each other.

Figure 17:
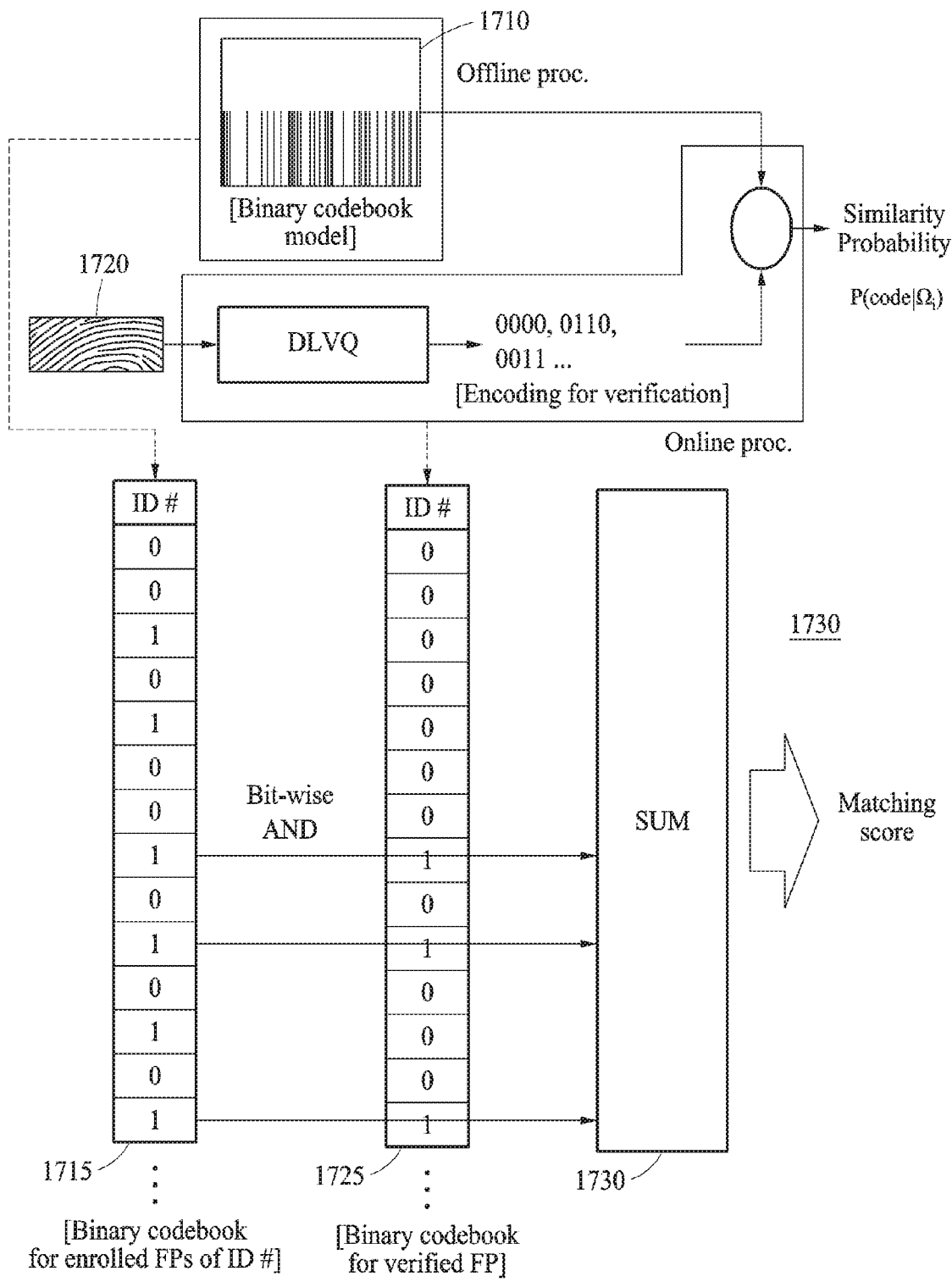
FIG. 17 illustrates an example of a process of authenticating a user based on a set of registered codes included in a pre-registered binary codebook.

FIG. 17 illustrates an example of a process of authenticating a user based on a set of registered codes included in a pre-registered binary codebook. Referring to FIG. 17, an authentication apparatus authenticates a user based on a similarity between a set 1715 of registered codes in a pre-registered binary codebook 1710 and a set 1725 of input codes.

The authentication apparatus performs a bitwise AND operation of bits ("00101001010101") of the binary codebook 1710 and bits ("1010001") of a binary codebook corresponding to the set 1725 of the input codes. The authentication apparatus adds up results of the bitwise AND operation to obtain a sum 1730. The authentication apparatus determines a similarity based on a result obtained by comparing the sum 1730 to a preset threshold. The authentication apparatus authenticates a user based on the similarity.

For example, the authentication apparatus calculates a similarity score between an encoded fingerprint image and a binary codebook based on a Bayesian probability, and measures the similarity based on the similarity score. The Bayesian probability is a probability theory that interprets a probability as a "quantity representing a degree of knowledge or belief" instead of interpreting a probability as a frequency or physical properties of a system. To evaluate a probability of a hypothesis, a prior probability is specified first and is changed to a new probability value by new relevant data. A Bayesian interpretation provides a standard set of procedures and formulae to perform the above calculation of probabilities.

When the binary codebook 1710 for enrolled fingerprints is generated, the authentication apparatus calculates a similarity score based on the Bayesian probability through a comparison between encoded values of enrolled fingerprints of a partial fingerprint image 1720 for authentication using Equation 5 shown below. Equation 5 represents a probability that an arbitrarily input partial fingerprint $I_{fp}$ has an enrollment ID(i).

$$P(\Omega_i \mid I_{fp}) \approx \sum_{1 < k < nS} f\left(P(\Omega_i \mid \hat{I}_{fp_k})\right) \quad \text{[Equation 5]}$$

In Equation 5, $I_{fp}$ denotes a partial input fingerprint, and $\Omega_i$ denotes a histogram model of user ID(i). $I_{fp}$ denotes a fingerprint image with N×N sub-blocks and nS denotes a number of sub-blocks of a single fingerprint image.

The authentication apparatus calculates a Bayesian probability for identification using Equation 6 shown below.

$$\underset{1 \leq i \leq N}{\text{argmax}} P(I_{fp} \mid \Omega_i) \quad \text{[Equation 6]}$$

In Equation 6, N denotes a number of enrollment IDs and $\Omega_i$, denotes a model with an enrollment ID of i.

A likelihood-ratio test is represented by Equation 7 shown below, and the authentication apparatus obtains a Bayesian probability for verification using Equation 7.

$$\frac{P(I_{fp} \mid \Omega_i)}{P(I_{fp} \mid \Omega_w)} \quad \text{[Equation 7]}$$

In Equation 7, $\Omega_i$, denotes a model with an enrollment ID of i, $\Omega_w$, and denotes a model generated using a large capacity DB for training in an offline process.

Figure 18:
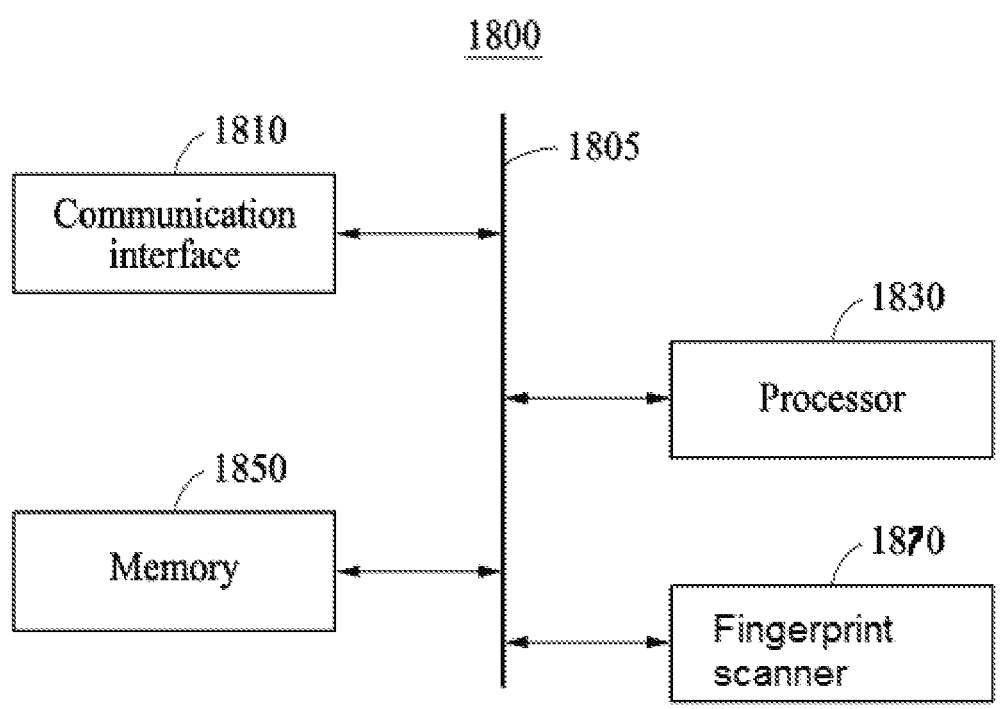
FIG. 18 illustrates an example of an authentication apparatus.

FIG. 18 illustrates an example of an authentication apparatus 1800. Referring to FIG. 18, the authentication apparatus 1800 includes a communication interface 1810, a processor 1830 and a memory 1850. The communication interface 1810, the processor 1830 and the memory 1850 communicate with each other via a bus 1805.

Either one or both of the communication interface 1810 or fingerprint scanner 1870 receives a fingerprint image of a user. The fingerprint scanner may be a separate vision sensor or a separate camera, or by a vision sensor or a camera included in the authentication apparatus 1800.

The processor 1830 divides the fingerprint image into a plurality of first sub-blocks, and generates a set of input codes by encoding the first sub-blocks based on a coded model stored in the memory 1850 (or accessed via communication interface 1810 to a remote storage location). The processor 1830 authenticates a user based on a similarity between the set of the input codes and a set of registered codes in a pre-registered binary codebook.

Also, the processor 1830 performs at least one of the methods described above with reference to FIGS. 1A through 17. The processor 1830 executes a program and controls the authentication apparatus 1800. A program code executed by the processor 1830 is stored in the memory 1850. The authentication apparatus 1800 may be connected to an external device such as a PC or a network, for example, via an input/output device (such as communication interface 1810 or via bus 1805), and may exchange data with the external device.

The memory 1850 stores the coded model.

The memory 1850 stores an enrollment DB including pre-enrolled images. The memory 1850 includes, for example, a volatile memory and a nonvolatile memory.

In an example, the authentication apparatus 1800 is implemented as a software module and operated by at least one processor. The software module is recorded in a form of a program in memory 1850 connected to the processor 1830. In another example, the authentication apparatus 1800 is implemented as a hardware module. In still another example, the authentication apparatus 1800 is implemented as a combination of a software module and a hardware module. In this example, a function implemented by the software module is performed by a process, and a function implemented by the hardware module is performed by corresponding hardware. The processor and the hardware exchange signals with each other via an input/output bus.

The authentication apparatus 1800 includes, for example, a mobile device such as a mobile phone, a smartphone, a personal digital assistant (PDA), a laptop computer, a computing device such as a PC, a tablet computer or a netbook, an electronic product such as a TV, a smart TV or a security device for gate control, and various electronic systems such as autonomous vehicles. Also, the authentication apparatus 1800 is used for fingerprint authentication in personal embedded terminals, for example, a smartphone or a smart card having a fingerprint authentication function.

The processor 1830 divides each of a plurality of fingerprint images included in a DB into a plurality of sub-blocks and generates a plurality of classes by grouping the sub-blocks. The processor 1830 generates a coded model used to classify the sub-blocks into corresponding classes. The memory stores the coded model.

The apparatuses, units, modules, devices, and other components illustrated in FIG. 18 that perform the operations described herein with respect to FIGS. 1A, 1B, 2, 10 and 11 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1A, 1B, 2, 10 and 11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storages, optical data storages, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art, after gaining a thorough understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A user authentication method using a fingerprint image, the user authentication method comprising:
   receiving at least a portion of a fingerprint image of a user;
   actuating a processor:
      to divide the fingerprint image into first sub-blocks;
      to generate a set of binary input codes by encoding the first sub-blocks based on a coded model;
      to measure a similarity between the set of the binary input codes and a set of registered binary codes in a binary codebook; and
      to authenticate the user based on the similarity,
   wherein the binary codebook is generated based on
      dividing each of enrolled partial fingerprint images of the user into a plurality of second sub-bocks, each of the plurality of the second sub-blocks being different than the first sub-blocks,
      changing at least one of a position or an angle at which each of the enrolled fingerprint images is to be cropped, and
      updating the binary codebook by encoding the second sub-blocks based or the coded model.

2. The user authentication method of claim 1, wherein the dividing of the fingerprint image into the first sub-blocks comprises one of:
   dividing the fingerprint image into the first sub-blocks so that cropped portions of the fingerprint image overlap; and
   dividing the fingerprint image into the first sub-blocks so that the cropped portions do not overlap.

3. The user authentication method of claim 1, wherein the dividing of the fingerprint image into the first sub-blocks comprises dividing the fingerprint image into the first sub-blocks by changing a position at which the fingerprint image is to be cropped.

4. The user authentication method of claim 1, wherein the generating of the set of the binary input codes comprises:
   classifying the first sub-blocks into one of a plurality of classes based on cropped portions of the fingerprint image, the classes being distinguished from each other; and
   generating the set of the binary input codes by the first sub-blocks encoded based on the classes.

5. The user authentication method of claim 1, wherein the coded model is generated by training a parameter of a deep neural network so that a class to which each of the first sub-blocks belongs is output in response to an input of each of the first sub-blocks.

6. The user authentication method of claim 1, wherein the fingerprint image comprises a full or a partial fingerprint of the user captured by a fingerprint scanner coupled to the processor.

7. The user authentication method of claim 1, wherein the measuring of the similarity comprises measuring the similarity based on whether the set of the binary input codes matches the set of the registered codes.

8. The user authentication method of claim 1, wherein the measuring of the similarity comprises:
performing a bitwise AND operation of bits of the pre-registered binary codebook and bits of a binary codebook corresponding to the set of the binary input codes;
adding up results of the bitwise AND operation;
comparing a sum obtained by adding up the results to a threshold; and
measuring the similarity based on a result of the comparing.

9. The user authentication method of claim 1, wherein the measuring of the similarity comprises:
calculating a similarity score between a fingerprint image encoded based on the coded model and registered codes included in the binary codebook based on a Bayesian probability; and
measuring the similarity based on the similarity score.

10. The user authentication method of claim 1, further comprising:
receiving the enrolled fingerprint images of the user.

11. The user authentication method of claim 1, further comprising:
encoding the second sub-blocks of the enrolled partial fingerprint images to generate and store the set of the registered codes in the binary codebook.

12. A method of generating a coded model for a user, the method comprising:
dividing each of a plurality of fingerprint images included in a database (DB) into sub-blocks with a predetermined size;
training a deep neural network comprising at least one processor via deep learning of the sub-blocks of the fingerprint images;
generating a plurality of classes by selectively grouping the sub-blocks based on the trained deep neural network; and
generating a coded model operably configured to classify sub-blocks of captured fingerprint images into corresponding classes,
wherein the coded model encodes sub-blocks of enrolled partial fingerprint images for each feature pattern, and stores a set of registered binary codes, being obtained by the encoding, in a binary codebook for each user or for each finger, and
wherein the binary codebook is generated based on
dividing each of the enrolled partial fingerprint images into a plurality of second sub-blocks, each of the plurality of the second sub-blocks being different than the first sub-blocks,
changing at least one of a position or an angle at which each of the enrolled fingerprint images is to be cropped, and
updating the binary codebook by encoding the second sub-blocks based or the coded model.

13. The method of claim 12, wherein the dividing of each of the fingerprint images into the sub-blocks comprises changing either one or both of a position or an angle parameter at which each of the fingerprint images is to be cropped, and dividing each of the fingerprint images into the sub-blocks based on the changed cropping parameter.

14. The method of claim 12, wherein the fingerprint images comprise at least one of fingerprint images of a plurality of users or fingerprint images of a plurality of fingers of a plurality of users.

15. The method of claim 12, wherein the generating of the classes comprises:
calculating a similarity between the sub-blocks; and
clustering the sub-blocks into groups with unique feature patterns based on the similarity.

16. The method of claim 15, wherein the calculating of the similarity comprises:
calculating an orientation distance between the sub-blocks based on a dominant direction between the sub-blocks and a normalized cross correlation (NCC) value between the sub-blocks; and
calculating the similarity based on the orientation distance.

17. The method of claim 15, further comprising:
assigning a unique identification (ID) to each of the classes.

18. The method of claim 12, wherein the generating of the coded model comprises generating the coded model by training a parameter of a deep neural network so that a class to which each of the sub-blocks belongs is output in response to an input of each of the sub-blocks.

19. A non-transitory computer-readable storage medium storing instructions that, when executed by a processor, cause the processor to perform the method of claim 12.

20. The method of claim 12, wherein each of the captured fingerprint images comprise a full fingerprint or a partial of a user captured by a fingerprint scanner.

21. A non-transitory computer-readable storage medium storing instructions that, when executed by a processor, cause the processor to perform the method of claim 1.

22. A user authentication apparatus comprising:
a communication interface configured to receive at least a portion of a fingerprint image of a user;
a memory configured to store a coded model; and
a processor coupled to either one or both of the communication interface and the memory and configured:
to divide the fingerprint image into first sub-blocks,
to generate a set of binary input codes by encoding the first sub-blocks based on the coded model, and
to authenticate the user based on a similarity measured between the set of the binary input codes and a set of registered codes in a binary codebook,
wherein the binary codebook is generated based on
dividing each of enrolled partial fingerprint images of the user into a plurality of second sub-bocks, each of the plurality of the second sub-blocks being different than the first sub-blocks,
changing at least one of a position or an angle at which each of the enrolled fingerprint images is to be cropped, and
updating the binary codebook by encoding the second sub-blocks based on the coded model.

* * * * *